(12) United States Patent
Ota (10) Patent No.: US 8,781,629 B2
(45) Date of Patent: Jul. 15, 2014

(54) HUMAN-ROBOT INTERFACE APPARATUSES AND METHODS OF CONTROLLING ROBOTS

(75) Inventor: Yasuhiro Ota, Union, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 783 days.

(21) Appl. No.: 12/888,108

(22) Filed: Sep. 22, 2010

(65) Prior Publication Data

US 2012/0072023 A1     Mar. 22, 2012

(51) Int. Cl.
*G05B 15/00*     (2006.01)
*G05B 19/00*     (2006.01)

(52) U.S. Cl.
USPC ........... 700/259; 700/245; 700/257; 700/258; 700/264; 318/568.12; 318/568.13; 318/568.16; 382/103; 382/181

(58) Field of Classification Search
USPC .......... 700/245, 257, 258, 259, 264; 715/863, 715/700; 318/567, 568.12, 568.13, 568.16; 382/103, 181
See application file for complete search history.

(56) References Cited

U.S. PATENT DOCUMENTS

| | | | |
|---|---|---|---|
| 4,675,502 A | 6/1987 | Haefner et al. | |
| 6,163,946 A | 12/2000 | Pryor | |
| 6,535,793 B2 * | 3/2003 | Allard | 700/259 |
| 6,587,752 B1 | 7/2003 | Saito | |
| 6,597,971 B2 | 7/2003 | Kanno | |
| 6,763,284 B2 | 7/2004 | Watanabe et al. | |
| 6,778,092 B2 | 8/2004 | Braune | |
| 6,816,755 B2 | 11/2004 | Habibi et al. | |
| 6,845,297 B2 | 1/2005 | Allard | |
| 7,086,293 B2 | 8/2006 | Heiligensetzer et al. | |
| 7,209,803 B2 * | 4/2007 | Okamoto et al. | 700/245 |
| 7,308,112 B2 * | 12/2007 | Fujimura et al. | 382/103 |
| 7,769,492 B2 | 8/2010 | Wang et al. | 700/257 |
| 7,802,193 B1 * | 9/2010 | McDonald et al. | 715/757 |
| 8,015,507 B2 * | 9/2011 | Madsen et al. | 715/824 |
| 8,155,787 B2 * | 4/2012 | Chalubert et al. | 700/245 |
| 8,238,612 B2 * | 8/2012 | Susca et al. | 382/107 |
| 8,392,036 B2 * | 3/2013 | Jacobsen et al. | 701/2 |
| 2002/0181773 A1 * | 12/2002 | Higaki et al. | 382/190 |

(Continued)

FOREIGN PATENT DOCUMENTS

| | | | | |
|---|---|---|---|---|
| JP | 2001060108 | | 3/2001 | |
| JP | 2001062766 A | * | 3/2001 | ............... B25J 13/06 |
| JP | 2003256025 | | 9/2003 | |
| JP | 2012066378 A | * | 4/2012 | |

*Primary Examiner* — Khoi Tran
*Assistant Examiner* — Jaime Figueroa
(74) *Attorney, Agent, or Firm* — Dinsmore & Shohl LLP (57) ABSTRACT

A method of controlling a robot using a human-robot interface apparatus in two-way wireless communication with the robot includes displaying on a display interface a two-dimensional image, an object recognition support tool library, and an action support tool library. The method further includes receiving a selected object image representing a target object, comparing the selected object image with a plurality of registered object shape patterns, and automatically recognizing a registered object shape pattern associated with the target object if the target object is registered with the human-robot interface. The registered object shape pattern may be displayed on the display interface, and a selected object manipulation pattern selected from the action support tool library may be received. Control signals may be transmitted to the robot from the human-robot interface. Embodiments may also include human-robot apparatuses (HRI) programmed to remotely control a robot.

20 Claims, 5 Drawing Sheets

(56) References Cited

U.S. PATENT DOCUMENTS

| | | | |
|---|---|---|---|
| 2004/0193413 A1* | 9/2004 | Wilson et al. | 704/243 |
| 2005/0271279 A1* | 12/2005 | Fujimura et al. | 382/203 |
| 2005/0273199 A1 | 12/2005 | Ban et al. | |
| 2006/0033713 A1* | 2/2006 | Pryor | 345/158 |
| 2006/0111812 A1* | 5/2006 | Okamoto et al. | 700/214 |
| 2007/0156017 A1* | 7/2007 | Lamprecht et al. | 600/102 |
| 2008/0079383 A1* | 4/2008 | Nakamoto | 318/587 |
| 2008/0147239 A1* | 6/2008 | Chiang et al. | 700/264 |
| 2009/0055019 A1* | 2/2009 | Stiehl et al. | 700/249 |
| 2009/0232506 A1* | 9/2009 | Hudson et al. | 398/106 |
| 2009/0279741 A1* | 11/2009 | Susca et al. | 382/107 |
| 2010/0017046 A1* | 1/2010 | Cheung et al. | 701/2 |
| 2010/0172733 A1* | 7/2010 | Chalubert et al. | 414/730 |
| 2011/0035051 A1* | 2/2011 | Kim et al. | 700/246 |
| 2011/0035087 A1* | 2/2011 | Kim et al. | 701/25 |
| 2011/0161852 A1* | 6/2011 | Vainio et al. | 715/769 |
| 2011/0172822 A1* | 7/2011 | Ziegler et al. | 700/259 |

* cited by examiner

HUMAN-ROBOT INTERFACE APPARATUSES AND METHODS OF CONTROLLING ROBOTS

TECHNICAL FIELD

The present specification generally relates to control of robotic devices and, more specifically, to human-robot interface apparatuses and methods for remotely controlling one or more robots.

BACKGROUND

Robotic devices are increasingly being used in a wide-variety of applications, such as in healthcare, manufacturing, and user-assistive applications. As the use of robots become more widespread, end-users that are not trained in the programming and control of robotic devices may have a need to use such devices. For example, a disabled person may have a need to use a servant robot to retrieve items or help him or her into and out of bed. However, the disabled person may not have been subjected to the extensive robotic programming training required to control the robot to perform desired tasks. Currently, users program the robot with complicated trajectory patterns to teach the robot to perform tasks. Further, manual control of a robot may be very tedious for the user. The user commonly must make all of the necessary judgments in accordance with the particular situation of the target object and/or ambient environment that the robot is located.

Accordingly, a need exists for alternative human-robot interface apparatuses and methods for the control of robots that enable object recognition and limit the need for user intervention.

SUMMARY

In one embodiment, a method of controlling a robot using a human-robot interface apparatus in two-way wireless communication with the robot includes displaying a two-dimensional image, a visual representation of an object recognition support tool library, and a visual representation of an action support tool library on a display interface of the human-robot interface. The two-dimensional image is provided by two video cameras associated with the robot. The method further includes receiving a selected object image representing a target object that was selected from the two-dimensional image, comparing the selected object image with a plurality of registered object shape patterns, and automatically recognizing a registered object shape pattern associated with the target object if the target object is registered with the human-robot interface. The registered object shape pattern may be displayed on the display interface, and a selected object manipulation pattern selected from the action support tool library may be received. Control signals may be transmitted to the robot from the human-robot interface. The control signals cause the robot to automatically approach the target object and perform an object manipulation of the target object in accordance with the object manipulation pattern.

In another embodiment, a human-robot interface apparatus includes a processor, a wireless communications module, a computer readable memory, and a display interface. The wireless communications module is in two-way wireless communication with a robot having two video cameras, a multi-fingered manipulator, and a locomotion base. The computer readable memory includes an object recognition support tool library, an action support tool library, and a set of tangibly embodied executable instructions. The registered object shape patterns correspond to a plurality of registered objects that are stored in the object recognition support tool library. The object manipulation patterns correspond to object manipulations of the plurality of objects that are stored in the action support tool library. The display interface displays a two-dimensional image provided by the two video cameras, a visual representation of the object recognition support tool library, and a visual representation of the action support tool library. The set of computer-readable instructions, when executed by the processor, causes the human-robot interface apparatus to receive selected object data corresponding to a selected object image representing a target object displayed within the two-dimensional image presented on the display interface, automatically recognize a registered object shape pattern corresponding to the selected object data and selected object image based at least in part on the registered objects stored in the object recognition support tool library, and receive an object manipulation pattern selected from the action support tool library. The computer-readable instructions may further instruct the processor to wirelessly instruct the robot via the wireless communications module to automatically approach the target object corresponding to the selected object image using the autonomous location base, and to perform an object manipulation on the target object using the multi-fingered manipulator based at least in part on the selected object manipulation pattern.

In yet another embodiment, a human-robot interface includes a wireless communications module, a computer readable memory, and a display interface. The wireless communications module is in two-way wireless communication with a robot having two video cameras, a multi-fingered manipulator, and a locomotion base. The computer readable memory includes an object recognition support tool library and an action support tool library. Registered object shape patterns corresponding to a plurality of registered objects are stored in the object recognition support tool library, and object manipulation patterns corresponding to object manipulations of the plurality of objects are stored in the action support tool library. The display interface displays a two-dimensional image provided by the two video cameras, a visual representation of the object recognition support tool library, and a visual representation of the action support tool library. The human-robot interface apparatus is programmed to automatically recognize a registered object shape pattern corresponding to a selected object image using a feature-based matching algorithm. The selected object image is selected from the two-dimensional display and represents a target object. The human-robot interface apparatus is further programmed to register an object shape pattern associated with the target object if a registered object shape pattern corresponding to the selected object image is not automatically recognized by receiving a selected shape from a plurality of shapes displayed in the visual representation of the object recognition support tool library. The selected shape is most similar to a shape of the target object. The human-robot interface apparatus may be further programmed to wirelessly transmit control signals to the robot via the wireless communications module to perform an object manipulation on the target object using the multi-fingered manipulator based at least in part on a selected object manipulation pattern selected from the visual representation of the action support tool library.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the drawings, embodiments described herein are directed toward human-robot interface apparatuses and methods that enable users to easily control a robot to complete particular tasks, such as approach and perform a manipulation on an object. Embodiments may allow people who are not trained in robotic programming to control robots to assist in the completion of tasks. For example, a person may want a servant robot to retrieve and deliver a particular object. As another example, a person may want the robot to operate a door knob to open a door so the person may enter or exit a room.

The robot may be wirelessly controlled by a human-robot interface apparatus having a display interface that displays a two-dimensional image of what the robot sees. The two-dimensional image may be produced by two stereo video cameras located on the robot. The display interface may also display an object recognition support tool library that contains information relating to registered and unregistered objects that the robot may encounter, as well as an action support tool library that contains instructions to the robot to perform various manipulations or actions on objects. A user of the human-robot interface apparatus may select an object that is depicted within the two-dimensional image. The robot may then automatically recognize a registered object shape pattern stored in the object recognition support tool library that is associated with the selected object by using an object recognition algorithm. The user may then select an object manipulation pattern from the action support tool library to instruct the robot to manipulate the target object associated with the selected object. The robot receives the instructions from the human-robot interface and manipulates the object in accordance with the selected object manipulation pattern. Various embodiments of human-robot interface apparatuses and methods thereof will be described in more detail herein.

Figure 1:
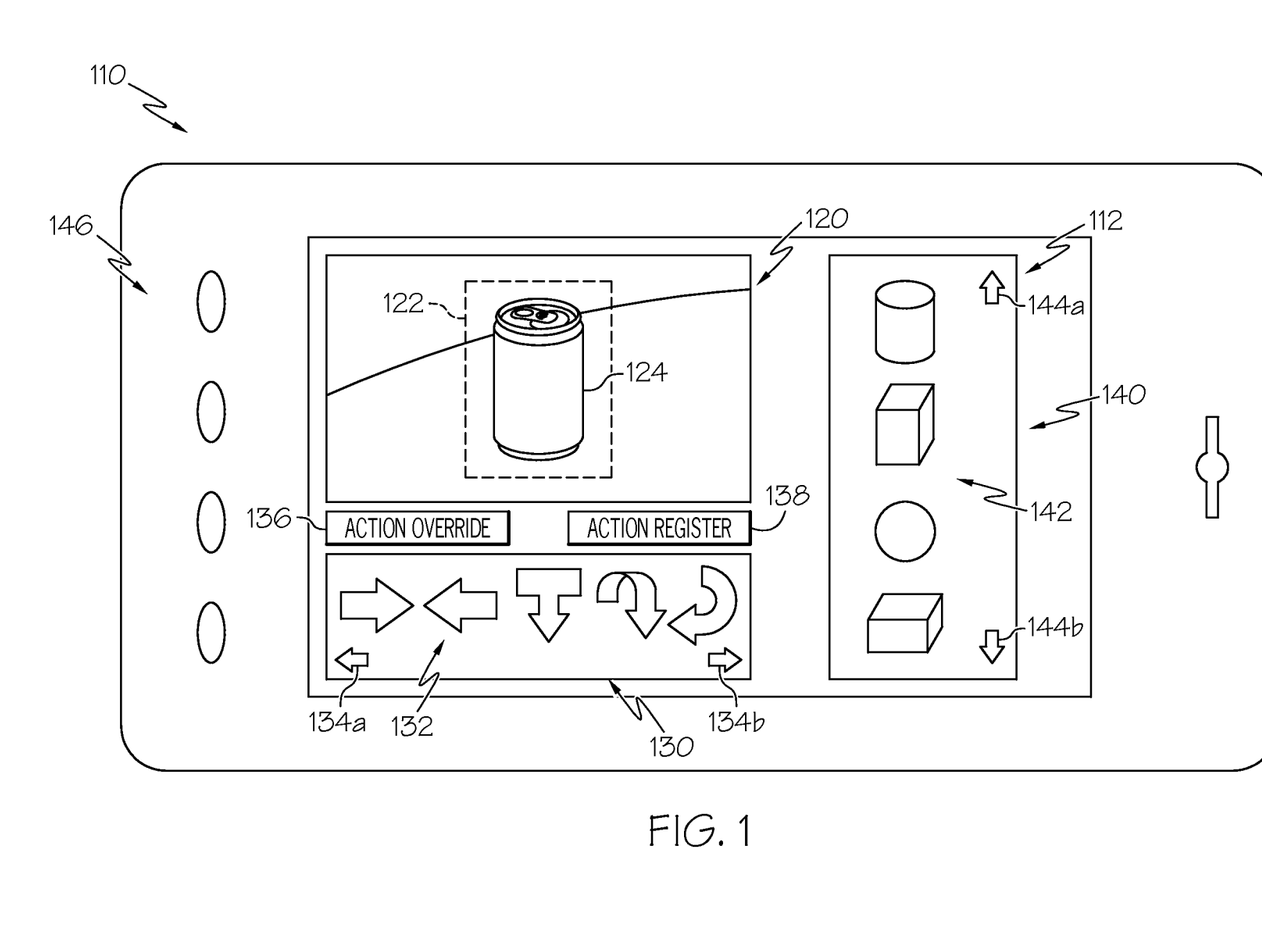
FIG. 1 depicts a schematic illustration of a human-robot interface apparatus according to one or more embodiments described and illustrated herein.
Figure 2:
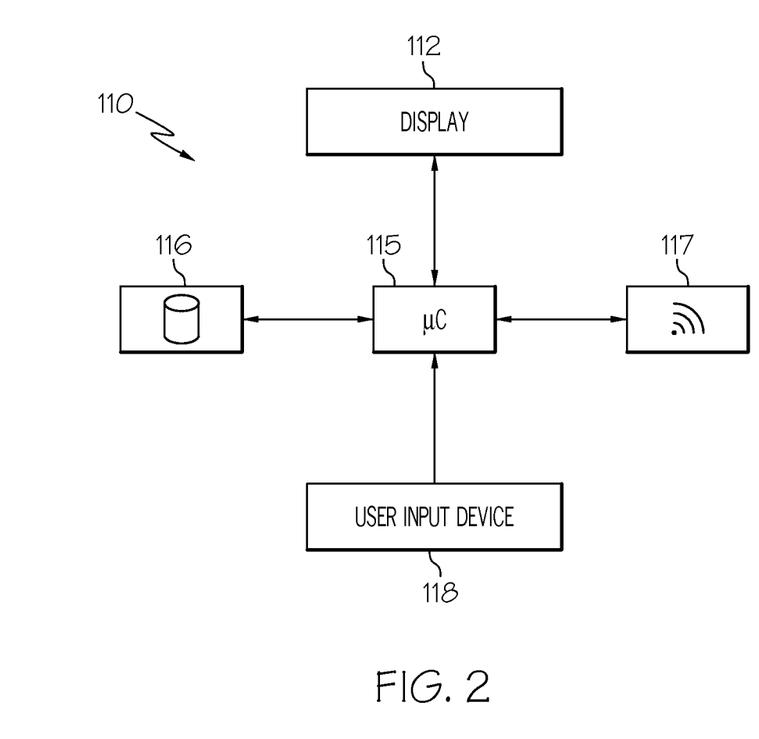
FIG. 2 depicts components of a human-robot interface apparatus according to one or more embodiments described and illustrated herein.

Referring now to FIGS. 1 and 2, one embodiment of a human-robot interface apparatus (HRI) 110 is illustrated. The illustrated HRI 110 is configured as a hand-held mobile phone device having one or more robot control programs that a user may operate to wirelessly control a robot, such as a servant robot. It is noted that although the HRI 110 is described in the context of servant robot applications (i.e., applications in which the robot assists people with everyday tasks), embodiments are not limited thereto. For example, the HRI 110 may also be used with robots in a production environment wherein the robots aid in the manufacture of goods.

The HRI 110 may be any device having a display interface that is capable of displaying an image of what the robot sees, as well as an object recognition support tool library and an action support tool library, all of which are described in detail below. The HRI 110 may be a desktop computer, a laptop computer, a netbook, a smart phone, media player, dedicated hardware, etc. The illustrated HRI 110 comprises a display interface 112, a plurality of hard keys 146 (e.g., mobile phone hard keys such as "talk," "end," etc., the functionality of which may or may not be used by HRI), a processor 115, computer readable memory 116, a wireless communications module 117, and one or more user input device 118. The processor 115, display interface 112, computer readable memory 116, wireless communications module and user input devices 118 may be coupled to a local interface that may be implemented as a bus or other interface to facilitate communication among the various components of the HRI 110.

The display interface 112 may be configured as any display device and may incorporate any display technologies, such as liquid crystal display, plasma display, cathode ray tube, electronic ink, etc. As stated above, the display interface 112 displays the two-dimensional image 120 of what the robot sees, the action support tool library 130, and the action support tool library 140. In the illustrated embodiment, the display interface 112 is configured as a touch screen such that a user may input commands into the HRI 110 by touching soft keys (e.g., Action Override soft key 136 and Action Register soft key 138) displayed in the display interface, highlighting portions of the two-dimensional image 120, etc. In other embodiments, the HRI 110 may include user input devices 118 such as a keyboard, mouse, joystick, etc. These other user input devices 118 may be used in conjunction with or in lieu of the touch-screen display interface 112.

The processor 115 may be communicatively coupled to the computer readable memory 116. The processor 115 may be any processor device capable of receiving and executing executable instructions to perform the functions described herein. As an example and not a limitation, the processor 115 may be a 32-bit reduced instruction set computer instruction set architecture developed and produced by ARM Holdings. It should be understood that other processor devices may be utilized, such as those developed and produced by Intel and AMD, for example.

The computer readable memory 116 may comprise one or more memory devices. The computer readable memory 116 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the computer readable memory 116 may be configured to store a set of tangibly embodied executable instructions that are configured to instruct the processor 115 and associated components to perform the HRI 110 functionality described herein. The set of executable instructions may be embodied as one or more robot control programs stored within a computer device, such as a desktop computer or smart phone, for example The wireless communications module 117 is communicatively coupled to the processor 115 and the computer readable memory 116, and is operable to wirelessly transmit and receive wireless signals 170 to and from a robot 160 (FIG. 3), as well as other external devices (e.g., a remote server). The wireless communications module 117 may be configured as a wireless communications component such as a wireless communications card or integrated circuit. The wireless communications module 117 may be configured to communicate over a computer network, including, but not limited to, a wide area network, such as the internet, a local area network (LAN), a mobile communications network and/or other network, and may be configured to electronically connect the HRI 110 to one or more robots 160. In one embodiment, the wireless communications module 117 is operable to wirelessly communicate via Wi-Fi or WiMax communications protocols. It should be understood that other wireless communications protocols may be utilized.

Figure 3:
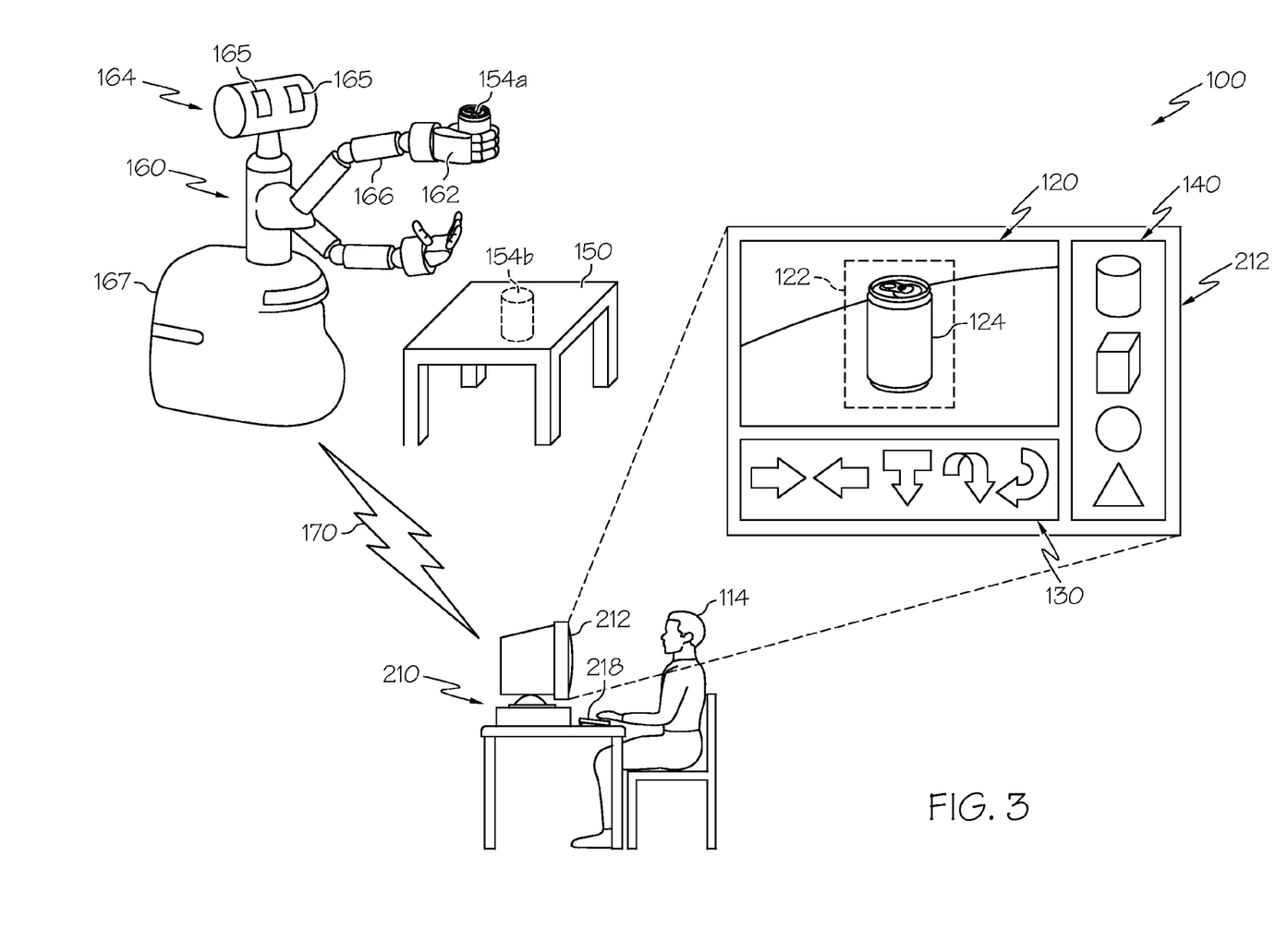
FIG. 3 depicts a robotic system comprising a robot and a human-robot interface apparatus according to one or more embodiments described and illustrated herein.

Referring now to FIG. 3, a robotic system 100 is illustrated wherein a user 114 controls a robot 160 via a HRI 210. It is noted that in the embodiment illustrated in FIG. 3, the HRI 210 is depicted as a desktop computer having a display interface 212 and user input devices 218 (keyboard and mouse). However, the functionality of the HRI 210 illustrated in FIG. 3 is essentially the same as the functionality of the hand-held HRI 110 illustrated in FIG. 1. The illustrated robot 160 comprises a head portion 164, an arm or arms 166, a manipulator hand 162, and a locomotion base 167. It should be understood that the embodiments described herein are not limited by the configuration of the robot 160 depicted in FIG. 3, and that the robot 160 may be of any shape and size. The configuration of the robot may depend on the type of robot that the HRI is communicatively coupled to.

The robot 160 includes a robot wireless communications module (not shown) that transmits and receives wireless signals to and from the HRI 210. In this manner, the robot 160 is in wireless communication with the HRI 210. The robot 160 may send various signals to the HRI 210, such as video signals, location signals, power-level signals, health signals, etc. The HRI 210 may send various signals to the robot 160, such as control signals corresponding to a selected object manipulation pattern, autonomous navigation initiation signals (e.g., instructions to travel to point A), remote control signals (e.g., manual control signals), etc.

The robot 160 comprises at least two video cameras 165 that may visually capture what the robot sees as it navigates within a space. In the illustrated embodiment, the video cameras 165 are located the head portion 164 of the robot 160. It should be understood that the video cameras 165 may be located at other regions of the robot 160. The video cameras 165 should be laterally separated such that they produce a stereo two-dimensional image. The combination of the two captured images cooperate to produce a stereo image that includes depth information such that the robot may operate in a three-dimensional space. For example, the robot may refer to the stereo image produced by the two video cameras to determine how far away a target object is from the robot. The robot may utilize a navigation algorithm to determine X, Y, and Z coordinates using the stereo two-dimensional image to both navigate within the space as well as manipulate objects within the space. The images produced by the two video cameras 165 may be wirelessly transmitted to the HRI over the wireless communications network such that the images are received by the wireless communications module 117, processed by the processor 115, and displayed as the two-dimensional image 120 on the display interface 112.

The arm 166 is coupled to a base of the robot 160 at one end, and the manipulator hand 162 at the other end. Embodiments may have one or more arms. The degrees of freedom provided by the arm 166 and manipulator hand 162 may depend on the type of robot being controlled. As an example, the manipulator hand 162 may be multi-fingered manipulator such that the manipulator hand 162 may grasp objects in a manner similar to that of a human hand. The movement of the arm 166 and manipulator hand 162 may be effectuated by a plurality of actuators, such as servo motors, for example. The actuators may be controlled via signals that are received from the HRI 210, as described in more detail below.

The locomotion base 167 is configured to move the robot 160 throughout a space. The locomotion base 167 may comprise one or more wheels (not shown) that are driven to transport the robot to and from various locations in accordance with instructions received from the HRI. The wheels may be driven by electric motors, for example. Other means for movement may also utilized, such as continuous tracks or moveable legs, for example. The robot 160 may receive instructions from the HRI 110/210 to autonomously travel from point A to point B. A processor of the robot (not shown) may then instruct the components of the locomotion base 167 to translate or rotate such that the robot 160 moves from point A to point B accordingly.

Referring to FIGS. 1-3, the object recognition support tool library 140 and the action support tool library 130 may be configured as one or more databases that are stored within the computer readable memory 116. It is noted that the object recognition support tool library 140 and the action support tool library 130 illustrated in FIGS. 1 and 3 on the display interface 110/210 are visual representations of the data that compose the object recognition support tool and action support tool libraries. For example, the visual representation of the object recognition support tool library 140 may provide illustrations of the various objects that are stored within the object recognition support tool library 140.

The object recognition support tool library 140 contains information relating to registered object shape patterns that represent the geometrical configuration of various objects. Each registered object shape pattern represents a particular object. A registered object shape pattern may contain information such as the size of the object, the geometry of the object, the texture of the object, the center of gravity of the object, fragility of the object, etc. The robot 160 uses the information of the registered object shape pattern to approach and manipulate the associated object in the actual space. Using the stereo two-dimensional image produced by the two video cameras 165 and the registered object shape pattern, the robot calculates the coordinates of the object and its position relative to the target object.

The object recognition support tool library 140 also contains primitive shape attributes (e.g., shapes 142) that may be used to register an unregistered object that the robot has encountered. These primitive shape attributes may be stored in the object recognition support tool library 140 and may be selectable by a user. As described in more detail below, a user may assign a primitive shape attribute to an object that the robot was not able to automatically recognize. In the illustrated embodiment, the visual representation of the object recognition support tool library includes scroll features 144a and 144b that allow a user to scroll through all of the stored registered objects and shapes 142.

The action support tool library 130 contains information relating to object manipulation patterns associated with the registered objects stored within the object recognition support tool library 140. Each object manipulation pattern contains instructions for the robot to move the locomotion base 167, arm 166, and/or the manipulator hand 162 to grasp and move an object in accordance with the desired task. As an example and not a limitation, a registered object may be a door knob. A plurality of object manipulation patterns may be associated with the door knob object and displayed to the user in the action support tool library 130 for the user to make a selection. One object manipulation pattern presented to the user may be to grasp the door knob and turn it to the right. Another object manipulation pattern may be to turn the door knob to the left. Other object manipulation patterns may also be presented, such as pushing the door open or pulling the door closed.

Object manipulation pattern icons 132 representing the different object manipulation patterns may be displayed within the visual representation of the action support tool library 130. Scroll features 134*a* and 134*b* may be provided to enable the user to scroll through different object manipulation pattern icons. A user may select a desired object manipulation pattern by touching the corresponding object manipulation pattern icon on the display interface 112. A mouse device may also be used to select the desired object manipulation pattern.

Each object manipulation pattern contains control instructions (e.g., a programmed robot routine) that are wirelessly transmitted to the robot 160. The robot 160 receives the control instructions and provides control signals to the various actuators so that the robot 160 performs the actions and movements associated with the object manipulation pattern. In this manner, the user may easily instruct the robot 160 to perform various tasks without the need for advanced robot programming knowledge.

The two-dimensional image 120 produced by the two video cameras 165 on the robot 160 is displayed within a region of the display interface 112. As stated above, the two-dimensional image 120 is a representation of the three-dimensional space that the robot 160 views using the two video cameras. The user is able to see objects that are near the robot 160 by viewing the two-dimensional image 120. As described in detail below, the user may select an object that he or she would like the robot 160 to perform a task on or otherwise manipulate. As illustrated in FIG. 1, the user may use a mouse or the touch-screen to draw a box 122 over an object 124 to select a specified portion of the two-dimensional image containing the object for manipulation. The processor may then receive selected object data that corresponds with the selected object 124 and then attempt to automatically recognize a registered object shape pattern that is associated with the selected object 124. For example if the selected object 124 is a soda can as illustrated in FIG. 1, and a soda can was previously registered as a registered object shape pattern, the HRI 110 may automatically recognize the selected object 124 as a soda can and retrieve the appropriate cylindrical registered object shape pattern from the object recognition support tool library.

It should be understood that embodiments are not limited to the arrangement of the two-dimensional image 120, the action support tool library 130 and the object recognition support tool library 140 within display interface 112, and that other arrangements are possible.

If the HRI 110 is implemented in a general purpose device, such as a smart phone, existing hard keys 146 may be used by the user for any number of purposes, such as to make selections within the two-dimensional image 120, the object recognition support tool library 140 and the action support tool library 130, as well as to manually control the robot 160, to change system parameters, etc.

Additional functions may also be provided on the display interface 112. For example, and Action Override button 136 may be presented that, when selected by the user, allows the user to override the execution of an object manipulation pattern and manually control the robot via the touch screen or a joystick. The Action Register button 138 may be selected by the user to register a new object manipulation pattern, as described in more detail below.

The operation of one embodiment of the HRI 110 and methods of controlling a robot will now be described with specific reference to the flowchart of FIG. 4 and general reference to the other figures. A user 114 may operate an HRI 110 to control a robot to perform various tasks, such as retrieval of an object. As an example, the robot 160 may be a servant robot that aids a user 114. The user 114 may be handicapped and rely on the servant robot 160 to deliver objects. FIG. 5 illustrates a user 114 and a robot 160 positioned within a living space. Within the living space are obstacles such as couch 192*a* and chairs 192*b*, 192*c*. A target object 154, which in the illustrated embodiment is a soda can, is located on a counter 194. The user 114 operating the robot 160 via the HRI 110 is sitting on the couch 192*a* and would like for the robot 160 to retrieve the soda can target object 154 from the counter 194 and deliver it to a table 150 located near the user.

As described above, a two-dimensional image 120 of the what the robot 160 sees via the two video cameras 165 is presented to the user on the display interface 112 of the HRI 110. In one embodiment, the user may control the head portion 164 of the robot 160 to rotate such that the two video cameras 165 scan the space (e.g., a living room). A zoom feature may also be provided so that the user can control the video cameras 165 to zoom in on an object. Once the user sees the desired object in the two-dimensional image 120, he or she may select the object. In one embodiment, the user may use his or her fingers on the touch-screen of the display interface 112 to draw a box 122 around or otherwise enclose the selected object.

Figure 4:
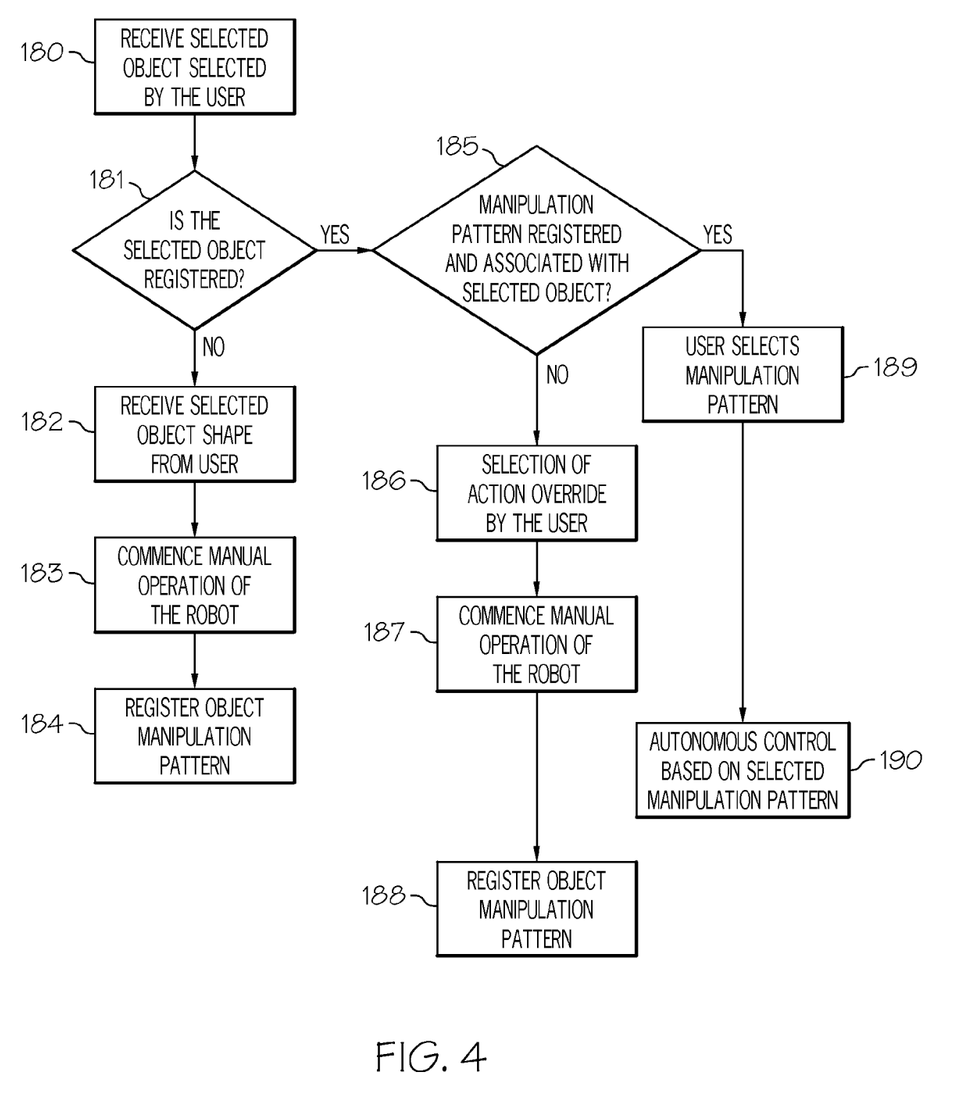
FIG. 4 depicts a flowchart illustrating a method of controlling a robot using a human-robot interface apparatus according to one or more embodiments described and illustrated herein.
Figure 5:
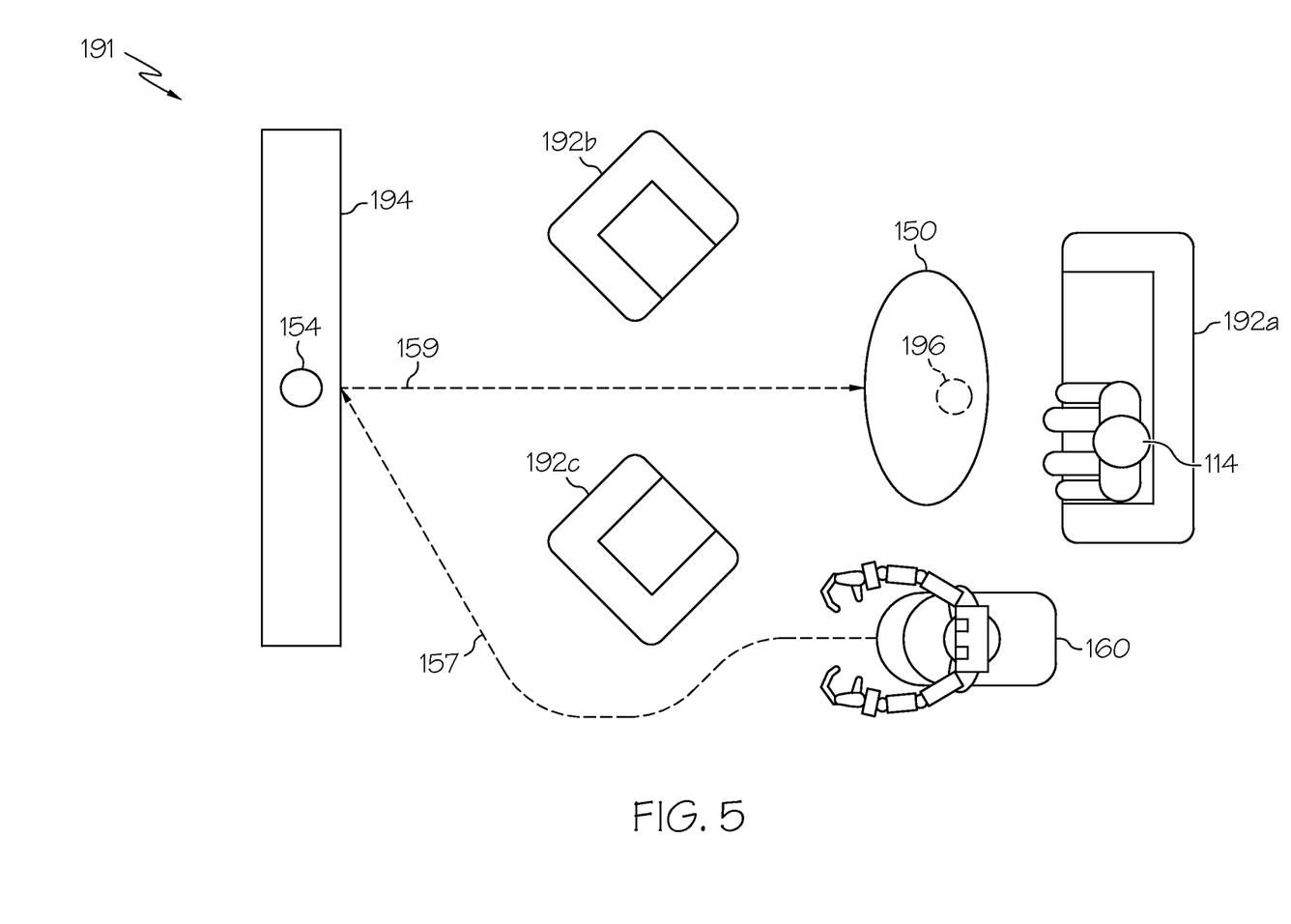
FIG. 5 depicts a robot being controlled within a space using a human-robot interface apparatus according to one or more embodiments described and illustrated herein.

The selected object 124 is then received by the HRI 110 as indicated by block 180 of FIG. 4. The selected object in the two-dimensional image 120 is a virtual representation of the actual target object in real space, which in the illustrated example is a soda can. At block 181, the HRI 110 attempts to automatically recognize a registered object shape pattern stored within the object recognition support tool library 140 that is associated with the selected object 124. The HRI 110 may be programmed with an image-based object recognition algorithm that receives the image of the selected object 124 and compares it with the registered object shape patterns. Any number of image-based object recognition algorithms or programs may be utilized.

In one embodiment, the image-based object recognition algorithm is a features-based matching algorithm, wherein features of the selected object are compared with features of the registered object shape patterns stored within the object recognition support tool library 140. In a features-based matching algorithm, features such as corners, edges and surface structures are compared to find a comparable match. Similarity values may be generated and the registered object shape pattern having the highest similarity value may be selected as the appropriate registered object shape pattern. One example of a features-based matching algorithm is a speeded-up robust features algorithm. It should be understood that other image-based object recognition algorithms may be utilized, such as scale-invariant feature transform and edge matching algorithms.

If a registered object shape pattern that matches the selected object 124 is found, then the selected object 124 is considered registered at block 181. If no registered object shape pattern is found, then the selected object 124 may be considered not registered. At block 182, if the selected object 124 is not registered, the user may browse the object recognition support tool library 140 to find an object shape that most closely matches the selected object 124. The object shapes may be previously defined and include the shapes of many different objects (e.g., spherical shapes, rectangular shapes, triangular shapes, etc.). In the illustrated embodiment, the user may select the cylindrical shape to associate with the selected object 124 because a soda can is generally cylindrical. The cylinder may then be registered as a registered object shape pattern and associated with the soda can.

When the user registers a new object, it may or may not have object manipulation patterns associated therewith. In one embodiment each object shape may have one or more default object manipulation patterns. The user may decide to program a new object manipulation pattern associated with the newly registered object shape pattern. As an example and not a limitation, the user may manually control the arm 166 and manipulator hand 162 to grasp the soda can using the touch-screen or other user input devices, such as a mouse and a keyboards. The HRI 110 may record the inputs provided by the user such that they may be stored as instructions as a newly registered object manipulation pattern associated with the selected object. Once the user completes the manual manipulation of the object, he or she may decide to register the movements as a registered object manipulation pattern at block 182. In one embodiment, the HRI comprises an optimization program that receives the control signals provided by the user as an input and then reduces the number of movements or steps such that the manipulation pattern executed by the robot is more efficient. For example, a user may not be experienced at manually controlling a robot so he or she may have had to correct the movements of the robot (e.g., a command may have caused the robot to overshoot the desired location of the manipulator hand). The optimization program may recognize movement overcompensation or other inefficiencies to create an optimized object manipulation pattern.

At block 185 it is determined whether or not there is a registered manipulation pattern associated with a registered object, or if there is a manipulation pattern that is associated with a desired object manipulation that the user wishes to perform. The user may browse the action support tool library 130 for a registered object manipulation pattern that matches the tasks that the user wishes to perform. If there is not an object manipulation pattern that suits the needs of the user, the user may select the Action Override button 136 on the display interface at block 187. At block 188, the robot may be manually controlled to register a new object manipulation pattern as described above with respect to blocks 183 and 184.

If there is an object manipulation pattern that suits the needs of the user, he or she may select the manipulation pattern icon associated with the desired object manipulation task in the action support tool library 130. The user may tap the manipulation pattern icon with the touch-screen, or select it with a mouse or other pointing device. As an example and not a limitation, the selected object may be a door knob. The user may select a manipulation pattern that provides for grasping the door knob and turning it to the right.

After the user selects the desired object manipulation pattern, control signals may be transmitted to the robot that instruct the robot to move in accordance with the object manipulation pattern to complete the desired task. The robot then completes autonomous control of the target object at block 190. Using the above-referenced door knob example, the robot may approach its hand to the door knob with a pre-registered hand shape (i.e., posture). The robot may then grasp the door knob with adequate force feedback control, which may be accomplished by a 6-axis force sensor located on the manipulator hand 162, and complete turning the door knob based on the torque observed by the 6-axis sensor. The force requirements may be preprogrammed into the registered object manipulation pattern. The robot may then open the door with adequate force feedback control such that the task of opening the door is completed. At any time during the autonomous object manipulation, the user may stop the robot by pressing the Action Override button 136, which will place the robot under manual control.

The robot 160 may autonomously or semi-autonomously approach the target object that corresponds with the selected object 124. Referring to FIG. 5, the robot 160 may be located at some distance from the target object 154, which in the illustrated embodiment is a soda can located on a counter 194 on an opposite side of the room from the robot 160. Using the two video cameras (as well as other navigational aids such as light beams, RFID tags attached to obstacles, etc., if utilized), the robot 160 may autonomously navigate the space to properly approach the target object 154. The robot 160 avoids obstacles, such as the two chairs 192b, 192c, as it navigates to the target object 154.

The robot may utilize a route planning algorithm to determine the most efficient route from its current location to the target object 154 or desired location (e.g., the near the table 150 to place the soda can on the table 150 at location 196). In one embodiment, the robot 160 uses the two video cameras to scan the space to detect obstacles. Using the three dimensional data provided by the two video cameras, the robot may detect the obstacles and their location within the space. In another embodiment, the robot may be preprogrammed with a floor plan such that it is aware of the layout of the space, including the obstacles and other forbidden areas. Using the video cameras and/or global positioning data (or other navigational equipment such as light beams, RFID signals, etc.), the robot 160 may autonomously navigate throughout the space. The robot 160 may also be equipped with obstacle avoidance sensors, such as IR obstacle avoidance sensors, for example. In one embodiment, the route planning algorithm may comprise a rapidly-exploring random tree route-planning algorithm (RRT). RRT may be used to efficiently plan a navigation route while avoiding obstacles that may be present within the space. A tree may be constructed within a representation of the space by generating samples within the space and connecting the samples to the closest sample of the tree. The robot navigation route may be selected based on the optimum path between point A and point B.

The robot 160 may also be driven manually to and from desired locations rather than autonomously. In this manner, the HRI 110 may act as a remote control in which the user manually directs the movement of the robot 160. The user may therefore direct the robot 160 toward the target object.

Using FIG. 5 as an example, a user 114 may select the soda can as the target object 154 and also select a grasping manipulation pattern from the action support tool library 130. The robot 160 may then automatically determine an optimum route (arrow 157) to the target object 154 that avoids the chair 192c using the route planning algorithm. Once at the target object 154, the robot 160 may get into position (e.g., the proper location with respect to the target object 154) to then commence execution of the selected object manipulation pattern. In the case of the soda can, the robot 160 may open the manipulator hand 162 to a proper posture and move the arm 166 such that the manipulator hand 162 contacts the soda can near the middle of the soda can. The robot 160 may then close the manipulator hand 162 with proper force as dictated by the selected object manipulation pattern, and then lift the soda can off of the counter 194. The user may then instruct the robot to approach the table 150 and place the can on the table, which would be another object manipulation pattern that the user may have selected. The robot 160 may automatically determine a route and travel to the desired location while avoiding obstacles (arrow 159). The user 114 may also chose to manually control the robot 160 to travel to the desired location, as well as to manually control the robot 160 to place the target object 154 on the table 150.

It should now be understood that the human-robot interface apparatuses and methods described herein enable a user that is not skilled in robotics programming to easily control a robot to complete tasks. The human-robot interface apparatuses and associated methods described herein display a two-dimensional image of what the robot sees using two video cameras, as well as display an object recognition support tool library and an action support tool library. The two-dimensional image, object recognition support tool library and action support tool library may be used by the user to wirelessly control the robot without the need for the user to enter complex trajectory plans or instructions. The user may select a target object on the two-dimensional image such that the human-robot interface apparatus automatically recognizes the object. The user may then select an object manipulation pattern such that the robot automatically manipulates the object according the object manipulation pattern. In some embodiments, the robot autonomously navigates to a target object using a route planning algorithm.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of controlling a robot using a human-robot interface apparatus in two-way wireless communication with the robot, the method comprising:
   displaying, automatically by a processor, a two-dimensional image on a display interface of the human-robot interface apparatus, wherein the two-dimensional image is provided by two video cameras associated with the robot;
   displaying on the display interface a visual representation of an object recognition support tool library having a plurality of registered object shape patterns and a visual representation of an action support tool library;
   receiving a selected object image selected from the two-dimensional image, wherein the selected object image represents a target object;
   comparing the selected object image with the plurality of registered object shape patterns and automatically recognizing a registered object shape pattern associated with the target object;
   receiving a selected object manipulation pattern selected from the action support tool library; and
   transmitting control signals to the robot from the human-robot interface apparatus, wherein the control signals cause the robot to automatically approach the target object and perform an object manipulation of the target object in accordance with the selected object manipulation pattern.

2. The method of claim 1, wherein the selected object image corresponds to a specified portion of the two-dimensional image that includes the selected object image, and the specified portion is selected by a user of the human-robot interface apparatus.

3. The method of claim 1, wherein the registered object shape pattern is automatically recognized using a feature-based matching algorithm.

4. The method of claim 1, wherein the registered object shape pattern is automatically recognized using a speeded-up robust features algorithm.

5. The method of claim 1, wherein:
   the visual representation of the object recognition support tool library displays a plurality of shapes; and
   the method further comprises registering an object shape pattern associated with the target object when a registered object shape pattern corresponding to the selected object image is not automatically recognized by receiving a selected shape from a plurality of shapes, the selected shape being most similar to a shape of the target object.

6. The method of claim 5, wherein the selected shape is selected from the object recognition support tool library by a user of the human-robot interface apparatus.

7. The method of claim 1, wherein:
   each registered object shape pattern has one or more associated object manipulation patterns; and
   each object manipulation pattern comprises instructions operable to be provided to the robot such that the robot executes the object manipulation.

8. The method of claim 7, wherein each object manipulation pattern instructs the robot where to grasp the target object and how to move the target object.

9. A human-robot interface apparatus comprising:
   a processor;
   a wireless communications module, wherein the wireless communications module is in two-way wireless communication with a robot, the robot comprising two video cameras, a multi-fingered manipulator, and a locomotion base;
   a computer readable memory comprising an object recognition support tool library, an action support tool library, and a set of tangibly embodied executable instructions, wherein registered object shape patterns corresponding to a plurality of registered objects are stored in the object recognition support tool library, and object manipulation patterns corresponding to object manipulations of the plurality of registered objects are stored in the action support tool library; and
   a display interface for displaying a two-dimensional image provided by the two video cameras, a visual representation of the object recognition support tool library, and a visual representation of the action support tool library,
   wherein the set of executable instructions, when executed by the processor, causes the human-robot interface apparatus to:
      receive selected object data corresponding to a selected object image displayed within the two-dimensional image presented on the display interface, wherein the selected object image represents a target object;
      automatically recognize a registered object shape pattern corresponding to the selected object data and the selected object image based at least in part on the plurality of registered objects stored in the object recognition support tool library;
      receive an object manipulation pattern selected from the action support tool library; and
      wirelessly instruct the robot via the wireless communications module to automatically approach the target object corresponding to the selected object image using the locomotion base, and to perform an object manipulation on the target object using the multi-fingered manipulator based at least in part on the selected object manipulation pattern.

10. The human-robot interface apparatus of claim 9, wherein the selected object image corresponds to a specified portion of the two-dimensional image that includes the selected object image.

11. The human-robot interface apparatus of claim 9, wherein the registered object shape pattern is automatically recognized using a feature-based matching algorithm.

12. The human-robot interface apparatus of claim 9, wherein the registered object shape pattern is automatically recognized using a speeded-up robust features algorithm.

13. The human-robot interface apparatus of claim 9, wherein:
the visual representation of the object recognition support tool library displays a plurality of shapes; and
when a registered object shape pattern corresponding to the selected object image is not automatically recognized, the set of executable instructions, when executed by the processor, further causes the human-robot interface apparatus to register an object shape pattern associated with the target object by receiving a selected shape from a plurality of shapes, the selected shape being most similar to a shape of the target object.

14. The human-robot interface apparatus of claim 13, wherein the selected shape is selected from the object recognition support tool library by a user of the human-robot interface apparatus.

15. The human-robot interface apparatus of claim 9, wherein:
each registered object shape pattern has one or more associated object manipulation patterns; and
each object manipulation pattern comprises instructions operable to be provided to the robot such that the robot executes the object manipulation.

16. The human-robot interface apparatus of claim 9, wherein the robot automatically approaches the target object using a rapidly-exploring random tree route-planning algorithm.

17. A human-robot interface apparatus comprising:
a wireless communications module, wherein the wireless communications module is in two-way wireless communication with a robot, the robot comprising two video cameras, a multi-fingered manipulator, and a locomotion base;
a computer readable memory comprising an object recognition support tool library and an action support tool library, wherein registered object shape patterns corresponding to a plurality of registered objects are stored in the object recognition support tool library, and object manipulation patterns corresponding to object manipulations of the plurality of registered objects are stored in the action support tool library; and
a display interface for displaying a two-dimensional image provided by the two video cameras, a visual representation of the object recognition support tool library, and a visual representation of the action support tool library,
wherein the human-robot interface apparatus is programmed to:
automatically recognize a registered object shape pattern corresponding to a selected object image using a feature-based matching algorithm, the selected object image being selected from the two-dimensional image and representing a target object;
register an object shape pattern associated with the target object when a registered object shape pattern corresponding to the selected object image is not automatically recognized by receiving a selected shape from a plurality of shapes displayed in the visual representation of the object recognition support tool library, the selected shape being most similar to a shape of the target object; and
wirelessly transmit control signals to the robot via the wireless communications module to perform an object manipulation on the target object using the multi-fingered manipulator based at least in part on a selected object manipulation pattern selected from the visual representation of the action support tool library.

18. The human-robot interface apparatus of claim 17, wherein the feature-based matching algorithm comprises a speeded-up robust features algorithm.

19. The human-robot interface apparatus of claim 17, wherein:
each registered object shape pattern has one or more associated object manipulation patterns; and
each object manipulation pattern comprises instructions operable to be provided to the robot such that the robot executes the object manipulation.

20. The human-robot interface apparatus of claim 17, wherein the robot automatically approaches the target object using a rapidly-exploring random tree route-planning algorithm.

* * * * *